(12) United States Patent
Wurmfeld et al.

(10) Patent No.: US 11,069,141 B2
(45) Date of Patent: *Jul. 20, 2021

(54) DYNAMIC CONFIGURATION OF AN AUGMENTED REALITY OVERLAY

(71) Applicant: Capital One Services, LLC, McLean, VA (US)

(72) Inventors: David Kelly Wurmfeld, Fairfax, VA (US); Kevin Osborn, Newton Highlands, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/426,277

(22) Filed: May 30, 2019

(65) Prior Publication Data

US 2019/0279431 A1 Sep. 12, 2019

Related U.S. Application Data

(63) Continuation of application No. 15/905,542, filed on Feb. 26, 2018, now Pat. No. 10,311,646.

(51) Int. Cl.
*G06T 19/00* (2011.01)
*G06K 9/00* (2006.01)
*G06T 7/579* (2017.01)
*G06K 9/46* (2006.01)
(Continued)

(52) U.S. Cl.
CPC ........ *G06T 19/006* (2013.01); *G06K 9/00208* (2013.01); *G06K 9/00671* (2013.01); *G06K 9/4671* (2013.01); *G06T 7/579* (2017.01); *G07F 19/20* (2013.01); *G06Q 20/1085* (2013.01)

(58) Field of Classification Search
None
See application file for complete search history.

(56) References Cited

U.S. PATENT DOCUMENTS 8,860,760 B2 10/2014 Chen et al.
9,153,073 B2 10/2015 Langlotz et al.
9,846,996 B1\* 12/2017 Moore .................. G07F 19/209
(Continued)

OTHER PUBLICATIONS

Besbes B., et al., "An Interactive Augmented Reality System: A Prototype for Industrial Maintenance Training Applications," Jan. 12, 2013, 2 pages.
(Continued)

*Primary Examiner* — Nurun N Flora
(74) *Attorney, Agent, or Firm* — Harrity & Harrity, LLP

(57) ABSTRACT

A device may detect, in a field of view of a camera, one or more components of an automated teller machine (ATM) device using a computer vision technique based on generating a three dimensional model of the one or more components. The device may identify the ATM device as a particular device or as a particular type of device based on the one or more components of the ATM device, or first information related to the ATM device. The device may identify a set of tasks to be performed with respect to the ATM device. The device may provide, for display via a display associated with the device, second information associated with the set of tasks as an augmented reality overlay. The device may perform an action related to the set of tasks, the ATM device, or the augmented reality overlay.

20 Claims, 7 Drawing Sheets

(51) Int. Cl.
*G07F 19/00* (2006.01)
*G06Q 20/10* (2012.01)

(56) References Cited

U.S. PATENT DOCUMENTS

| | | | |
|---|---|---|---|
| 10,311,646 B1* | 6/2019 | Wurmfeld | G06K 9/00208 |
| 2008/0191860 A1 | 8/2008 | Flook et al. | |
| 2012/0116920 A1 | 5/2012 | Adhikari et al. | |
| 2014/0126769 A1 | 5/2014 | Reitmayr et al. | |
| 2014/0183269 A1 | 7/2014 | Glaser et al. | |
| 2014/0233860 A1 | 8/2014 | Kis et al. | |
| 2014/0270350 A1* | 9/2014 | Rodriguez-Serrano | G06K 9/6267 382/103 |
| 2014/0293016 A1 | 10/2014 | Benhimane et al. | |
| 2014/0310595 A1* | 10/2014 | Acharya | G06T 11/00 715/706 |
| 2014/0320593 A1 | 10/2014 | Pirchheim et al. | |
| 2015/0009214 A1 | 1/2015 | Lee et al. | |
| 2015/0186708 A1 | 7/2015 | Katz et al. | |
| 2015/0310124 A1* | 10/2015 | Ben-Aharon | G06F 40/106 715/205 |
| 2016/0071319 A1* | 3/2016 | Fallon | G06T 19/006 345/633 |
| 2016/0350906 A1 | 12/2016 | Meier et al. | |
| 2016/0358383 A1 | 12/2016 | Gauglitz et al. | |
| 2017/0206676 A1 | 7/2017 | Nakazato et al. | |
| 2017/0316357 A1 | 11/2017 | Meganathan et al. | |
| 2018/0082304 A1 | 3/2018 | Summerlin et al. | |
| 2018/0262489 A1 | 9/2018 | Wadley et al. | |

OTHER PUBLICATIONS

Grifantini K., "Faster Maintenance with Augmented Reality," MIT Technology Review, Oct. 26, 2009, 9 pages. Retrieved from Internet: [URL:https://www.technologyreview.com/s/415977/faster-maintenance-with-augmented-reality/].

Henderson S., et al., "Augmented Reality for Maintenance and Repair (ARMAR)," Feb. 26, 2018, 5 pages. Retrieved from Internet: [URL:http://graphics.cs.columbia.edu/projects/armar/index.htm].

IAR, Apr. 26, 2014, 4 pages. Retrieved from Internet: [URL:http://www.iar-soft.com/en/].

Ke C., et al., "An Augmented reality-based Application for Equipment Maintenance," 2001, 6 pages. Retrieved from Internet: [URL:https://pdfs.semanticscholar.org/3e61/5594bb7c1Oad861c2d5602c91ee55653e9a5.pdf].

Kohles C., "Augmented Reality: Remote Assistance and Maintenance Overview," Nov. 21, 2017, 10 pages. Retrieved from Internet: [URL:https://www.wikitude.com/blog-augmented-reality-maintenance-and-remote-assistance/].

Matthews A., "Augmented Reality Simplifies Repairs and Maintenance," Apr. 21, 2017, 6 pages. Retrieved from Internet: [URL:https://www.electronicspecifier.com/vr-ar/augmented-reality-simplifies-repairs-and-maintenance].

Sung D., "Augmented Reality in Action—Maintenance and Repair," Mar. 1, 2011, 10 pages. Retrieved from Internet: [URL:https://www.pocket-lint.com/ar-vr/news/108887-augmented-reality-maintenance-and-repair].

Wikipedia., "Augmented Reality," Feb. 24, 2018, 28 pages. Retrieved from Internet: [URL:https://en.wikipedia.org/wiki/Augmented_reality].

Wikipedia., "Scale-Invariant Feature Transform," Feb. 15, 2018, 16 pages. Retrieved from Internet: [URL:https://en.wikipedia.org/wiki/Scale-invariant_feature_transform].

* cited by examiner

DYNAMIC CONFIGURATION OF AN AUGMENTED REALITY OVERLAY

RELATED APPLICATION

This application is a continuation of U.S. patent application Ser. No. 15/905,542, filed Feb. 26, 2018 (now U.S. Pat. No. 10,311,646), which is incorporated herein by reference.

BACKGROUND

Augmented reality (AR) is a live direct or indirect view of a physical, real-world environment where elements of the environment are "augmented" by computer-generated perceptual information across one or more sensory modalities, such as visual, auditory, haptic, somatosensory, and/or olfactory. Whereas virtual reality replaces a real world environment with a simulated environment, augmented reality alters one's current perception of a real world environment.

SUMMARY

According to some possible implementations, a device may comprise one or more memories; and one or more processors, communicatively coupled to the one or more memories, configured to detect, in a field of view of a camera, one or more components of an automated teller machine (ATM) device using a computer vision technique based on generating a three dimensional model of the one or more components. The one or more processors may be configured to identify the ATM device as a particular device or as a particular type of device based on at least one of: the one or more components of the ATM device detected in the field of view of the camera, or first information related to the ATM device. The one or more processors may be configured to identify a set of tasks to be performed with respect to the ATM device after identifying the ATM device as the particular device or the particular type of device. The one or more processors may be configured to provide, for display via a display associated with the device, second information associated with the set of tasks as an augmented reality overlay after identifying the set of tasks. The one or more processors may be configured to perform an action related to the set of tasks, the ATM device, or the augmented reality overlay after providing the augmented reality overlay for display.

According to some possible implementations, a non-transitory computer-readable medium may store one or more instructions that, when executed by one or more processors, may cause the one or more processors to detect, in a field of view of a camera associated with a device, one or more components of another device based on generating a three dimensional model. The one or more components may be detected using a combination of a scale-invariant feature transform (SIFT) technique and a monocular simultaneous localization and mapping (monoSLAM) technique. The one or more instructions, when executed by the one or more processors, may cause the one or more processors to identify the other device as a particular device or as a particular type of device after detecting the one or more components. A particular configuration of the one or more components of the other device may indicate that the other device is the particular device or the particular type of device. The one or more instructions, when executed by the one or more processors, may cause the one or more processors to identify a set of tasks to be performed with respect to the other device after identifying the other device as the particular device or the particular type of device. The one or more instructions, when executed by the one or more processors, may cause the one or more processors to provide, for display via a display associated with the device, second information associated with the set of tasks as an augmented reality overlay after identifying the set of tasks. The one or more instructions, when executed by the one or more processors, may cause the one or more processors to perform an action related to the set of tasks, the other device, or the augmented reality overlay after providing the augmented reality overlay for display.

According to some possible implementations, a method may include generating, by a device, a three dimensional model of one or more components of another device. The method may include detecting, by the device and in a field of view of a camera associated with the device, the one or more components of the other device. The method may include identifying, by the device, the other device as a particular device or as a particular type of device after detecting the one or more components. The method may include processing first information after identifying the other device as the particular device or as the particular type of device. The first information may relate to at least the other device. The method may include identifying, by the device, a set of tasks to be performed with respect to the other device based on the first information. The method may include providing, by the device and for display via a display associated with the device, second information associated with the set of tasks as an augmented reality overlay after identifying the set of tasks. The method may include monitoring, by the device, a performance of the set of tasks by capturing one or more images at different points in time after providing the second information for display as the augmented reality overlay for display. The method may include updating, by the device, the augmented reality overlay after monitoring the performance of the set of tasks. The method may include performing, by the device, an action related to the set of tasks, the other device, or the augmented reality overlay after providing the augmented reality for display.

DETAILED DESCRIPTION

Figure 1A:
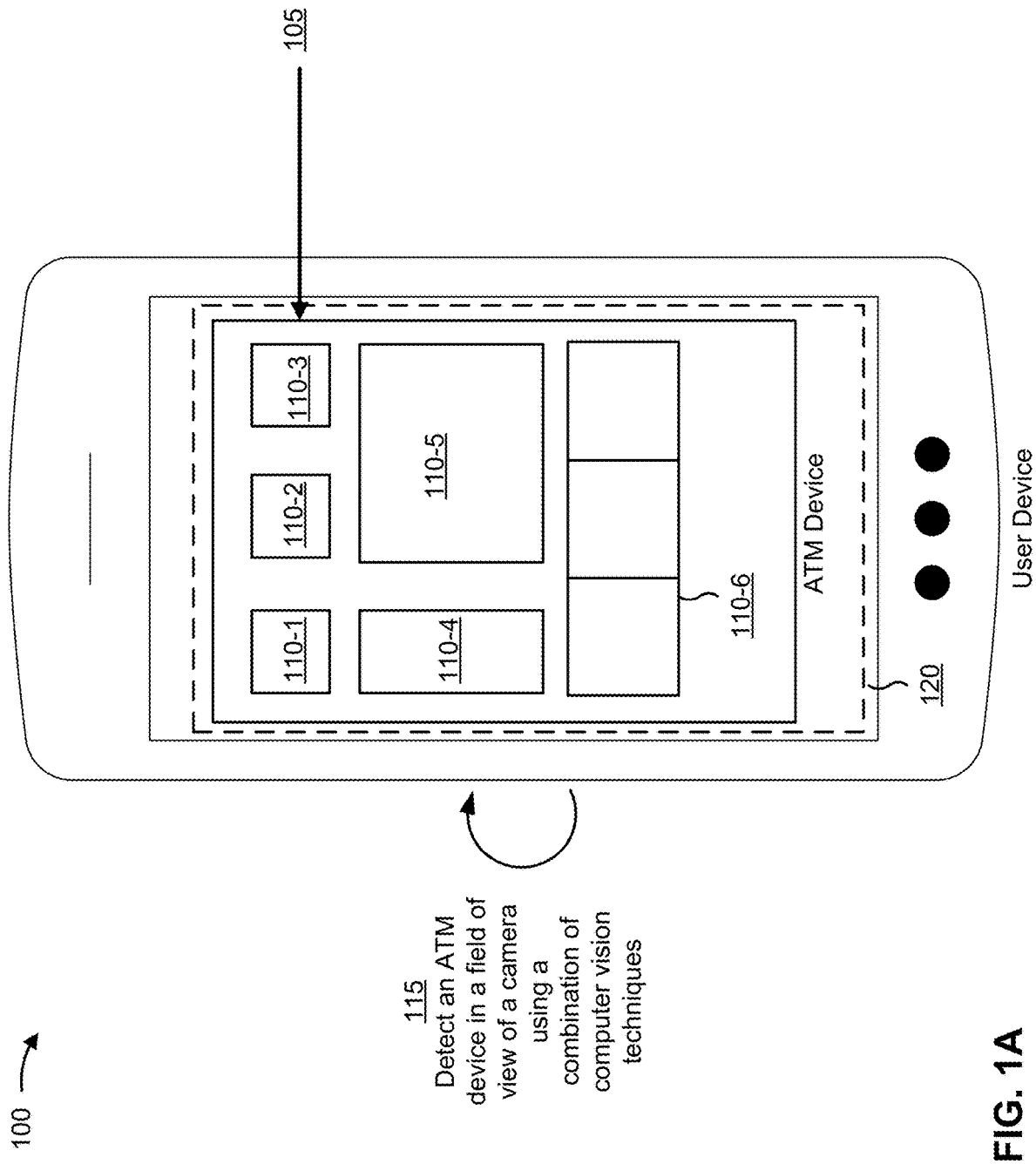
FIGS. 1A-1D are diagrams of an overview of an example implementation described herein.

The following detailed description of example implementations refers to the accompanying drawings. The same reference numbers in different drawings may identify the same or similar elements.

In some industries, equipment may need to be serviced (e.g., periodically, according to a schedule, on the occurrence of certain events, etc.). For example, parts of the equipment may need to undergo maintenance, may need to be repaired, may need to be inspected, and/or the like. In some cases, a technician may have to service various types of equipment and/or may service equipment produced by different manufacturers, thereby complicating the task of servicing the equipment. In addition, in some cases, equipment may be customized from a standard configuration (e.g., parts of the equipment may be modified, the equipment may include additional parts not initially included in the equipment, the equipment may be missing parts initially included in the equipment, etc.), further complicating the task of servicing the equipment. Further, a set of tasks that needs to be performed when servicing equipment may vary based on various factors, such as weather conditions, an amount of time since the last servicing, non-routine tasks that have been scheduled for the equipment, and/or the like. This can result in missed tasks during servicing, poor quality servicing, and/or the like. In addition, a technician may need to undergo significant training to service equipment, thereby delaying deployment of the technician to the field, increasing a cost of servicing equipment, and/or the like.

Some implementations described herein provide a user device that is capable of identifying equipment being serviced, identifying a set of tasks to be performed with respect to the equipment, and providing information related to the set of tasks for display as an augmented reality overlay. In this way, the user device can assist with servicing the equipment to reduce a quantity of tasks that are missed, to monitor completion of the tasks, and/or the like. This improves servicing of the equipment by improving a quality of the servicing. In addition, this increases a capability of a technician related to servicing different types of equipment and/or equipment with different configurations by reducing a level of skill needed by the technician with regard to servicing the equipment. Further, this reduces an amount of time needed to service equipment, thereby improving a servicing throughput of a technician, reducing a cost associated with servicing the equipment, and/or the like. Further, this reduces downtime (or offline time) for the equipment being service. Further, this improves operation of the equipment by facilitating servicing of the equipment and/or more accurate servicing of the equipment.

FIGS. 1A-1D are diagrams of an overview of an example implementation 100 described herein. As shown in FIGS. 1A-1D, example implementation 100 may include a user device, an automated teller machine (ATM) device, and a server device (shown in FIG. 1D).

As shown in FIG. 1A, and by reference number 105, the user device may be pointed (e.g., by a user of the user device) at an ATM device (e.g., the back of an ATM device that has been opened for servicing) to capture and display components of the ATM device (shown by reference numbers 110-1 through 110-6). For example, a camera associated with the user device may be pointed at an internal portion of the ATM device and a display associated with the user device may be displaying an image captured by the camera, a field of view of the camera, and/or the like. The components may include a cash drawer, a cash recycler, a processor, a display, and/or the like. Different ATM devices and/or different types of ATM devices may have different configurations of components, thereby increasing a difficulty of accurately servicing the components. For example, correct denominations of cash need to be placed into the proper cash drawers to prevent incorrect dispensing of cash. However, with different configurations of components, a technician may easily confuse cash drawers when servicing different ATM devices and/or different types of ATM devices. As a result, some implementations described herein facilitate accurate servicing of components across differently configured ATM devices.

As further shown in FIG. 1A, and by reference number 115, the user device may detect an ATM device in a field of view of a camera, such as by using a combination of computer vision techniques (e.g., a scale-invariant feature transform (SIFT) technique, a monocular simultaneous localization and mapping (monoSLAM) technique, etc.). The user device may use the computer vision techniques to generate a three-dimensional (3D) model of the components of the ATM device, and may compare the 3D model to previously generated 3D models on which the user device has been trained to identify the ATM device as an ATM device, to identify the ATM device as a particular type of ATM device, to identify the ATM device as a particular ATM device, and/or the like. In some implementations, a server device may use the computer vision techniques to generate the 3D model and/or to compare the 3D model to a previously generated 3D model and may provide the results of the comparison to the user device.

In some implementations, the user device may capture an image of a model number, a serial number, and/or the like of the ATM device and may narrow the set of possible types of ATM devices and/or particular ATM devices of the ATM device to a smaller set, from which the correct 3D model may be generated. This aides the user device in generating the 3D model, thereby conserving processing resources related to generating the 3D model.

As shown by reference number 120, the user device may cause an augmented reality overlay to be provided for display after detecting the ATM device in the field of view of the camera. For example, the augmented reality overlay may identify the ATM device as an ATM device, may identify the type of the ATM device, the particular ATM device, may confirm detection of the ATM device, may identify a portion of a field of view of the camera in which the ATM device is located, and/or the like.

Figure 1B:
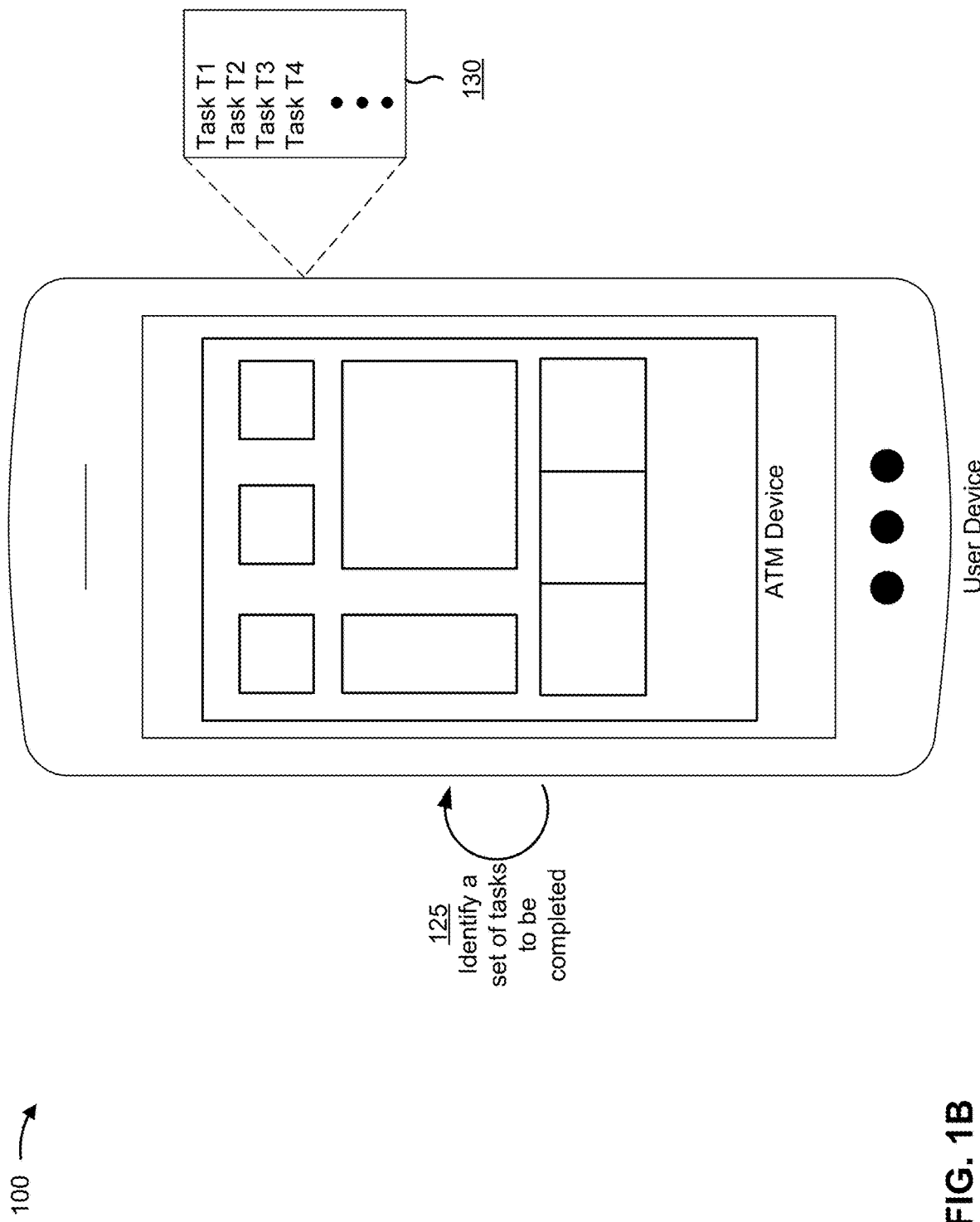

As shown in FIG. 1B, and by reference number 125, the user device may identify a set of tasks to be completed with respect to the ATM device and/or components of the ATM device. For example, as shown by reference number 130, the user device may identify tasks T1 through T4 to be performed when the ATM device is serviced. In some implementations, the user device may identify the set of tasks based on the type of device identified, the type of ATM device identified, and/or the particular ATM device identified. Additionally, or alternatively, the user device may identify the set of tasks based on other factors, such as weather conditions, a quantity of times the ATM device has been serviced, special instructions associated with the ATM device, a servicing schedule related to the ATM device, and/or the like.

Figure 1C:
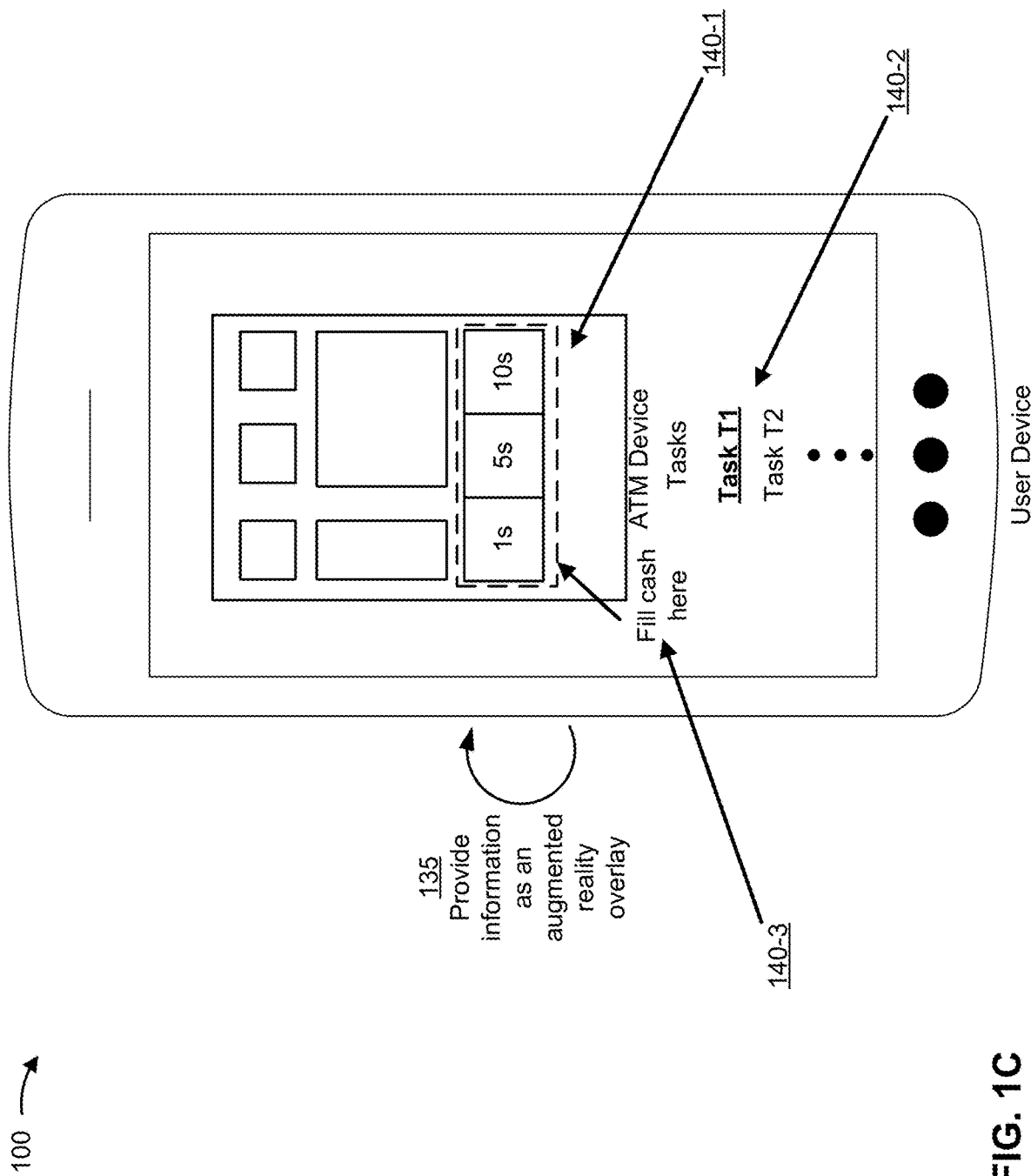

As shown in FIG. 1C, and by reference number 135, after the user device has identified the set of tasks, the user device may provide information associated with the set of tasks as an augmented reality overlay via the display associated with the user device. For example, as shown by reference number 140-1, the augmented reality overlay may identify certain components of the ATM device (e.g., may identify which of the components are cash drawers and/or cash denominations associated with each of the cash drawers). As shown by reference number 140-2, the augmented reality overlay may identify a current task that is being performed by a technician, a set of tasks that have been performed by the technician, a set of tasks to be completed, and/or the like (e.g., to help a technician track a progress of servicing of the ATM device, to help a technician determine an order of the set of tasks to be completed, and/or the like). As shown by reference number 140-3, the augmented reality overlay may include instructions related to a current task being performed.

Figure 1D:
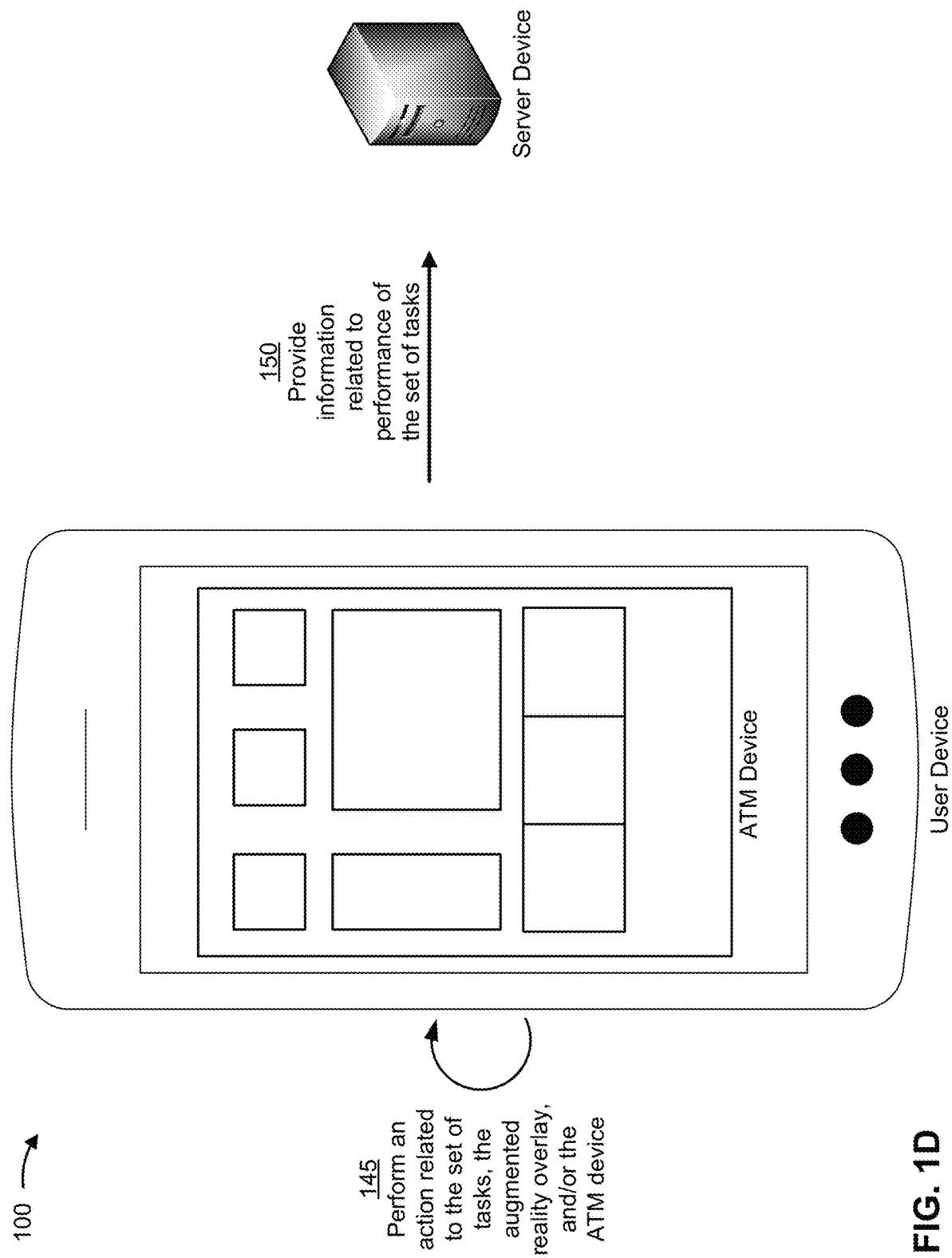

As shown in FIG. 1D, and by reference number 145, the user device may perform an action related to the set of tasks, the augmented reality overlay, and/or the ATM device. For example, the user device may monitor performance of the tasks, such as by processing images to identify which components are being serviced, identifying a way in which a configuration of components has been changed (e.g., between a pre-servicing time to and a post-servicing time), determining whether components have been swapped out (e.g., based on unique identifiers located on the exteriors of the components), and/or the like. Additionally, or alternatively, as tasks are completed, the user device may update the augmented reality overlay to indicate completion of the tasks and/or provide different information for display as an augmented reality overlay. Additionally, or alternatively, the user device may record metrics associated with servicing the ATM device, such as an amount of time it takes for the technician to perform each of the tasks, an order in which the tasks are performed, and/or the like.

As further shown in FIG. 1D, and by reference number 150, the user device may provide information related to performance of the set of tasks to the server device so that the server device can analyze the information related to performance of the set of tasks, generate reports about the performance of technicians, identify trends or patterns among technicians or in the performance of tasks, and/or the like.

In this way, the user device can dynamically configure an augmented reality overlay based on an ATM device identified in a field of view of a camera associated with the user device. This facilitates a more efficient servicing of the ATM device, thereby reducing a cost and/or an amount of time associated with servicing an ATM device. In addition, this conserves processing resources of the user device that would otherwise be consumed by a technician looking up a set of tasks to be completed with regard to servicing the ATM device. Further, this reduces or eliminates errors to servicing, thereby conserving resources (e.g., time resources, fuel resources of a vehicle, etc.) that would otherwise be consumed sending a technician back to the ATM device to fix the errors.

As indicated above, FIGS. 1A-1D are provided merely as an example. Other examples are possible and may differ from what was described with regard to FIGS. 1A-1D. For example, although the implementations were described in the context of servicing an ATM device, the implementations apply equally to servicing other types of equipment and/or devices, such as a computer, a vehicle, equipment of an office or facility (e.g., a manufacturing facility), and/or the like. In addition, although the user device was described as performing the functions herein, the functions may be performed by another device, such as the server device, which may provide results of performing the functions to the user device.

Figure 2:
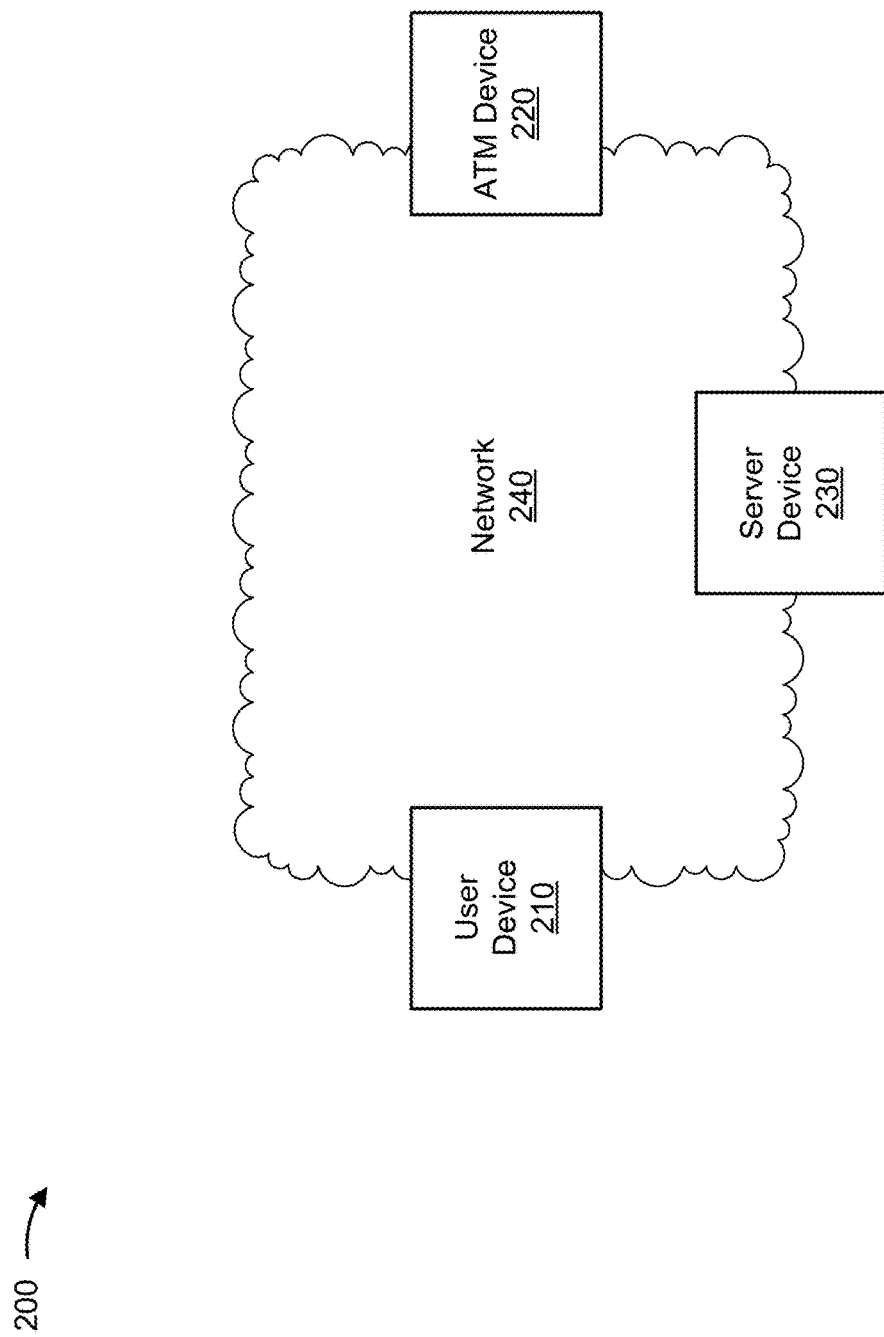
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include user device 210, ATM device 220, server device 230, and network 240. Devices of environment 200 may interconnect via wired connections, wireless connections, or a combination of wired and wireless connections.

User device 210 includes one or more devices capable of receiving, generating, storing, processing, and/or providing information associated with configuring an augmented reality overlay. For example, user device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 may detect, within a field of view of a camera associated with user device 210, ATM device 220, a type of ATM device 220, a particular ATM device 220, and/or the like, as described elsewhere herein. Additionally, or alternatively, user device 210 may provide, for display, information related to a set of tasks to be completed with regard to ATM device 220 as an augmented reality overlay, as described elsewhere herein.

ATM device 220 includes one or more devices capable of performing various types of financial transactions, such as a cash withdrawal, a money deposit (e.g., a check or cash deposit), a money transfer (e.g., a transfer from one bank account to another bank account), access to information related to an account (e.g., a bank account, a checking account, a credit account, etc.), and/or the like. For example, ATM device 220 may include an ATM, an automated banking machine (ABM), a cash point, a Cashline®, a Minibank®, a cash machine, a Tyme® machine, a cash dispenser, a Bankomat®, a Bancomat®, and/or a similar type of device. In some implementations, ATM device 220 may include a set of components to be serviced by a technician that is using user device 210, as described elsewhere herein.

Server device 230 includes one or more devices capable of receiving, generating, storing, processing, and/or providing information associated with a set of tasks to be completed with regard to ATM device 220. For example, server device 230 may include a server (e.g., in a data center or a cloud computing environment), a data center (e.g., a multi-server micro data center), a workstation computer, a virtual machine (VM) provided in a cloud computing environment, or a similar type of device. In some implementations, server device 230 may provide, to user device 210, information that identifies a set of tasks to be completed with regard to ATM device 220, as described elsewhere herein. Additionally, or alternatively, server device 230 may analyze information related to a set of tasks performed with regard to ATM device 220, as described elsewhere herein. In some implementations, server device 230 may perform one or more of the actions described as being performed by user device 210 and may provide results of the actions to user device 210. In some implementations, server device 230 may be a physical device implemented within a housing, such as a chassis. In some implementations, server device 230 may be a virtual device implemented by one or more computer devices of a cloud computing environment or a data center.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of cellular network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
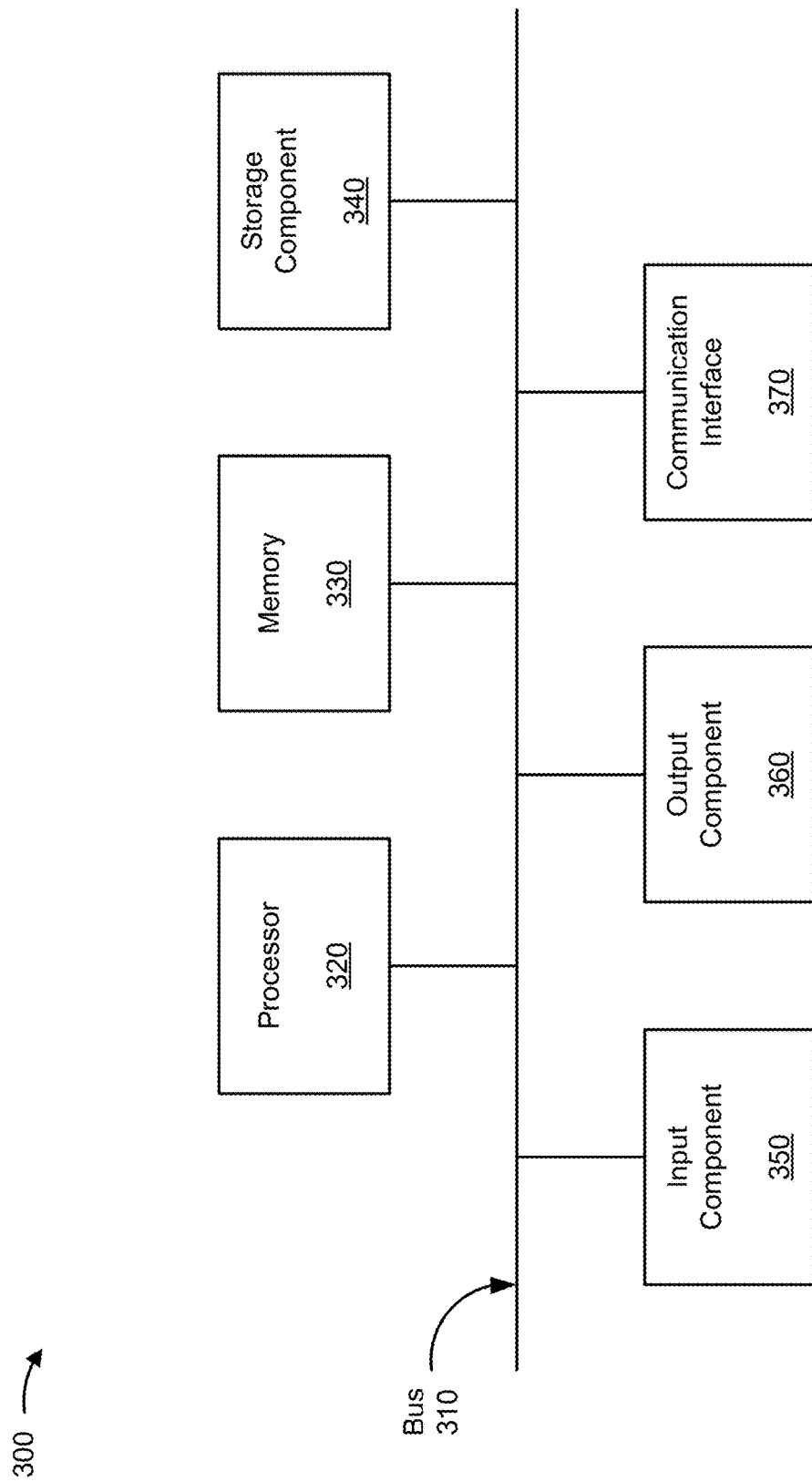
FIG. 3 is a diagram of example components of one or more devices of FIG. 2.

FIG. 3 is a diagram of example components of a device 300. Device 300 may correspond to user device 210, ATM device 220, and/or server device 230. In some implementations, user device 210, ATM device 220, and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
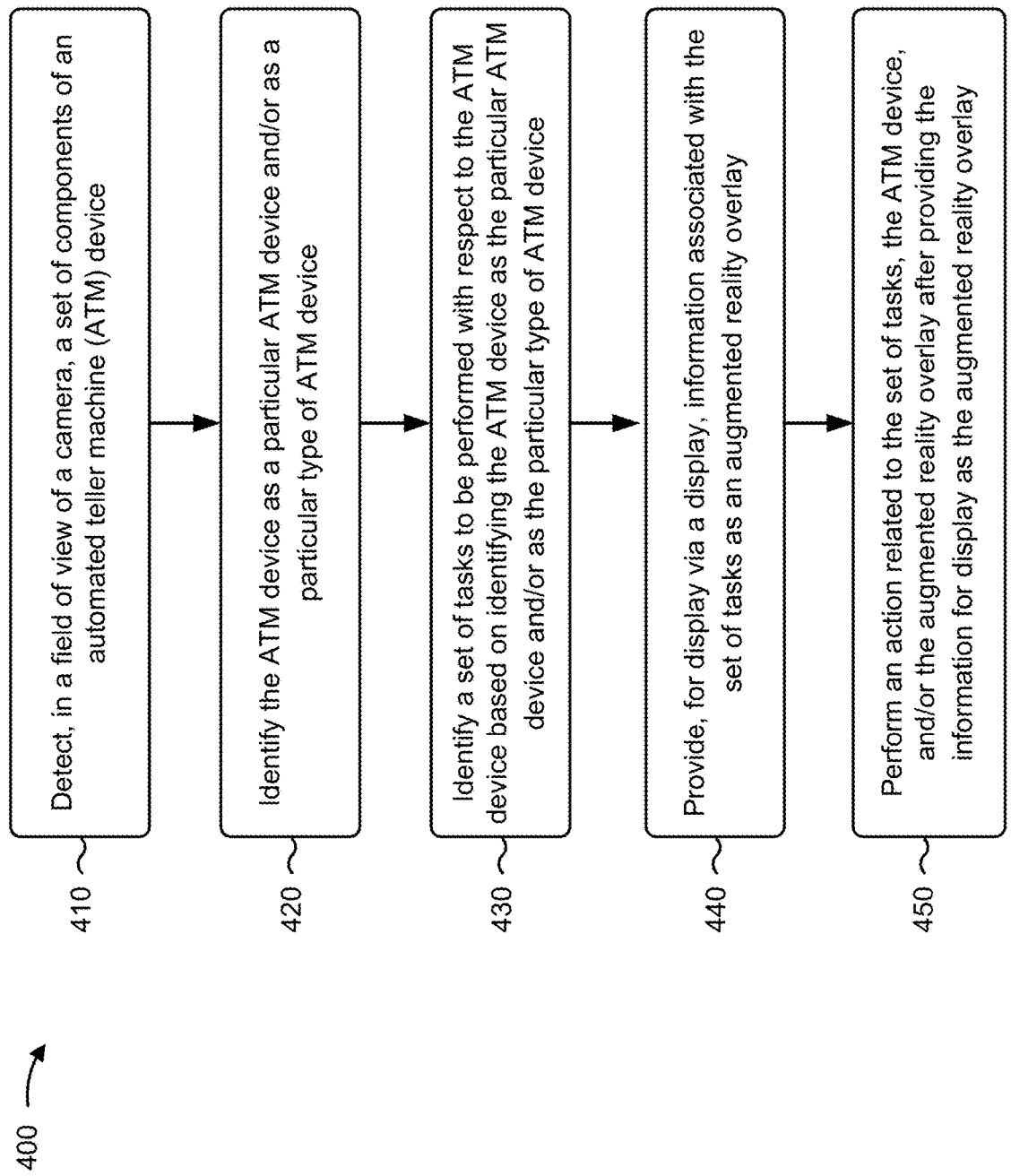
FIG. 4 is a flow chart of an example process for dynamic configuration of an augmented reality overlay.

FIG. 4 is a flow chart of an example process 400 for dynamic configuration of an augmented reality overlay. In some implementations, one or more process blocks of FIG. 4 may be performed by user device 210. In some implementations, one or more process blocks of FIG. 4 may be performed by another device or a group of devices separate from or including user device 210, such as ATM device 220 or server device 230.

As shown in FIG. 4, process 400 may include detecting, in a field of view of a camera, a set of components of an automated teller machine (ATM) device (block 410). For example, user device 210 may detect (e.g., using processor 320, memory 330, storage component 340, input component 350, and/or the like), in a field of view of a camera of user device 210, a set (one or more) of components of ATM device 220. In some implementations, the set of components of ATM device 220 may include a set of cash drawers, a cash recycler, a printer, a display, a key pad, various computing components, such as a memory, a CPU, and/or a cryptographic component, and/or the like. In some implementations, user device 210 may detect different components for other types of equipment and/or devices (e.g., of a computer, of a vehicle, of manufacturing equipment, etc.).

In some implementations, user device 210 may detect the set of components using a combination of computer vision techniques, such as computer vision techniques related to generating a three dimensional model of the set of components. For example, user device 210 may detect the set of components using the combination of a scale-invariant feature transform (SIFT) technique and a monocular simultaneous localization and mapping (monoSLAM) technique. Continuing with the previous example, user device 210 may use the SIFT technique to detect features of ATM device 220 and/or the set of components of ATM device 220 in a field of view of a camera associated with user device 210 and may use the monoSLAM technique to generate a mapping of features and/or the set of components of ATM device 220.

In some implementations, user device 210 may provide information to another device to process images from user device 210 using the computer vision techniques. For example, a first user device 210 (e.g., a pair of smart eyeglasses) may send images captured by the first user device 210 to a second user device 210 (e.g., a paired mobile phone) and/or to server device 230 so that the second user device 210 and/or server device 230 can process the images using the computer vision techniques. Continuing with the previous example, the second user device 210 and/or server device 230 may output information to the first user device 210 (e.g., information to be provided for display as an augmented reality overlay).

In some implementations, user device 210 may determine that a particular combination of components is included in the set of components after detecting the set of components, as described elsewhere herein. For example, the particular combination of components may be an expected set of components for a particular type of ATM device 220, for a particular manufacturer of ATM device 220, for a particular deployment of ATM device 220, and/or the like. Additionally, or alternatively, and as another example, the particular combination of components may include a particular arrangement of an expected set of components (e.g., an arrangement that identifies a particular type of ATM device 220, a particular manufacturer, etc.).

Additionally, or alternatively, the particular combination of components may include particular modifications to an expected set of components. That is, for example, some ATM devices (or other devices) may include custom (or otherwise unique or uncommon) components or configurations. In some embodiments, the computer vision techniques may be configured to identify the one or more custom components and configurations. In some implementations, user device 210 may determine that the particular combination of components has been modified from an expected set of components after determining that the particular combination of components is included in the set of components. For example, a modification to an expected set of components may include a customization to an expected set of components, such as a removal of a component from an expected set of components, an addition of an additional component to an expected set of components, swapping out an expected component for an aftermarket component, and/or the like.

In some implementations, user device 210 may generate a three dimensional (3D) model of the set of components using a combination of computer vision techniques. For example, the combination of computer vision techniques may include a scale-invariant feature transform (SIFT) technique, or a monocular simultaneous localization and mapping (monoSLAM) technique. In this case, detecting the set of components may include detecting the set of components using the 3D model after generating the 3D model (e.g., by comparing the generated 3D model to 3D models stored by user device 210, based on a machine learning model of user device 210 having been trained on a training set of models, etc.). In some implementations, the three dimensional model may be used to identify ATM device 220 as an ATM device 220, as a particular type of ATM device 220 (e.g., a particular model, from a particular manufacturer, etc.), and/or as a particular ATM device 220 (e.g., a particular deployment of an ATM device 220), as described elsewhere herein.

Additionally, or alternatively, user device 210 may identify a 3D model based on performing a lookup based on identifying a combination of components included in ATM device 220. For example, if user device 210 determines that ATM device 220 includes a first component (e.g., based on detecting an identifier for the first component in an image captured by user device 210), then user device 210 may perform a lookup to identify a 3D model related to the first component. Additionally, or alternatively, and as another example, if user device 210 determines that ATM device 220 includes a combination of components, user device 210 may perform a lookup to identify a 3D model that includes the same combination of components. Continuing with the previous example, ATM device 220 may differentiate among multiple 3D models that include the same combination of components based on detecting information that identifies a model of ATM device 220, information that identifies a location of ATM device 220, a servicing schedule related to a technician, and/or the like. In some implementations, user device 210 may perform similar actions to identify a modification to a component (e.g., by determining whether a 3D model for an un-modified component of ATM device 220 or a 3D model for a modified component of ATM device 220 matches an image of the component).

In some implementations, user device 210 may process the 3D model to identify the set of components after detecting the set of components. For example, user device 210 may process the 3D model using a feature extraction technique after generating the 3D model using the combination of computer vision techniques. In this way, by using a feature extraction technique, user device 210 can facilitate better identification of components in the 3D model (e.g., in varied light conditions). As another example, user device 210 may use a machine learning module to process the 3D model to determine whether the 3D model matches another model on which the machine learning module has been trained. This facilitates quick identification of ATM device 220, a particular type of ATM device 220, and/or the like, thereby conserving computing resources of user device 210.

In some implementations, user device 210 may detect the set of components by detecting an identifier associated with the set of components (e.g., on an exterior of the set of components). In some implementations, the identifier may uniquely identify a component. For example, the identifier may be a sticker, a bar code, a Quick Response (QR) code, a serial number, a model number, an identifier of a manufacturer, a radio frequency identification (RFID) tag, and/or the like.

In some implementations, user device 210 may process (or identify) the identifier using a sensor (e.g., a camera, a reader component, etc.). For example, user device 210 may capture and process an image of the set of components using an image processing technique (e.g., an optical character recognition (OCR) technique, a computer vision technique, etc.) to process the identifier. Additionally, or alternatively, and as another example, user device 210 may use a reader component of user device 210 to scan a bar code, a QR code, an RFID tag, and/or the like to process the identifiers associated with the set of components.

In some implementations, user device 210 may combine this information with images of the set of components and/or accelerometer information to identify a location and/or configuration of the set of components present. For example, user device 210 may use information identifying the identifiers detected, and/or a location and/or configuration of the components based on the identifiers, to improve processing of the 3D model. Continuing with the previous example, based on this information, user device 210 may determine a likelihood of a likely location of a particular component in the 3D model to improve detection of the particular component. Additionally, or alternatively, and continuing still with the previous example, based on the identifiers present and accelerometer information collected by a sensor of user device 210 when identifying the identifiers, user device 210 may determine that a particular component, associated with a particular identifier, is likely to be located in a particular portion of the 3D model. This conserves processing resources of user device 210 by increasing a speed at which a set of components can be identified, and/or improves an accuracy of processing a 3D model to detect and/or identify a set of components included in ATM device 220.

In this way, user device 210 may detect a set of components of ATM device 220 prior to identifying ATM device 220.

As further shown in FIG. 4, process 400 may include identifying the ATM device as a particular ATM device and/or as a particular type of ATM device (block 420). For example, user device 210 may identify (e.g., using processor 320, input component 350, communication interface 370, and/or the like) ATM device 220 as a particular ATM device 220 and/or as a particular type of ATM device 220. In some implementations, user device 210 may identify ATM device 220 as an ATM device 220, as a particular type of ATM device 220, as a particular ATM device 220, and/or the like after determining that a particular combination of components is included in the set of components. In some implementations, user device 210 may identify ATM device 220 as a particular type of ATM device 220 and/or as a particular ATM device 220 prior to detecting a set of components of ATM device 220.

In some implementations, user device 210 may identify ATM device 220 as the particular type of ATM device 220 based on the set of components including an expected set of components. For example, the expected set of components may be identified in another 3D model (e.g., on which a machine learning module has been trained). In some implementations, a machine learning module may have been trained on the other 3D model and information identifying the components identified in the 3D model, information that identifies a particular type of ATM device 220 associated with the 3D model, a particular ATM device 220 associated with the 3D model, information identifying modifications to an expected set of components identified by the 3D model, and/or the like.

In some implementations, user device 210 may identify ATM device 220 as the particular ATM device 220 based on the 3D model identifying another set of components in addition to the expected set of components, a modification to the expected set of components, and/or the like. In some implementations, user device 210 may identify ATM device 220 as the particular ATM device 220 by matching the 3D model and another 3D model on which user device 210 has been trained. In some implementations, user device 210 may identify the closest matching 3D model to the generated 3D model (e.g., by matching a threshold quantity of components among the 3D models) and may identify the remaining components individually to identify a modification to the expected set of components. In some implementations, user device 210 may generate a list of the components included in the 3D model and compare the list to other lists that are associated with particular ATM devices 220 (e.g., to identify modifications and/or deviations from an expected list of components). In some implementations, user device 210 may identify ATM device 220 as the particular ATM device 220 after determining that the particular combination of components has been modified from the expected set of components.

In some implementations, user device 210 may identify ATM device 220 as the particular ATM device 220 based on information related to ATM device 220 or the set of components (e.g., location information that identifies a location of the particular ATM device 220) after identifying ATM device 220 as the particular type of ATM device 220. For example, the information may include location information that identifies a location of ATM device 220, configuration information that identifies a set of components included in ATM device 220, a list of expected components for ATM device 220, a list of modifications to ATM device 220, and/or the like.

In this way, user device 210 may identify ATM device 220 prior to identifying a set of tasks to be performed with respect to ATM device 220.

As further shown in FIG. 4, process 400 may include identifying a set of tasks to be performed with respect to the ATM device based on identifying the ATM device as the particular ATM device and/or as the particular type of ATM device (block 430). For example, user device 210 may identify (e.g., using processor 320, memory 330, storage component 340, input component 350, communication interface 370, and/or the like) a set of tasks to be performed with respect to ATM device 220 based on identifying ATM device 220 as the particular ATM device 220 and/or as the particular type of ATM device 220. For example, the set of tasks may be related to servicing ATM device 220, performing maintenance on ATM device 220, inspecting ATM device 220, and/or the like.

In some implementations, user device 210 may perform a lookup, in a data structure, of information identifying the type of ATM device 220 and/or the particular deployment of ATM device 220, and may identify a corresponding set of tasks to be performed.

In some implementations, after identifying ATM device 220 as the particular ATM device 20 or as the particular type of ATM device 220, user device 210 may process information that relates to ATM device 220, the set of components of ATM device 220, and/or the like. In some implementations, user device 210 may identify the set of tasks based on location information that identifies a location of ATM device 220, based on schedule information that identifies a schedule of tasks to be performed with respect to ATM device 220, based on historical information that identifies a set of historical tasks that has been performed with respect to ATM device 220, based on weather information (e.g., humidity, temperature, precipitation, etc.) that identifies weather conditions at the location of ATM device 220, and/or the like. For example, weather conditions may impact functioning of ATM device 220 and/or may be associated with particular types of inspections of ATM device 220. By accounting for this information, user device 210 may accurately identify the tasks that need to be performed for ATM device 220, thereby improving servicing of ATM device 220.

Additionally, or alternatively, server device 230 may aggregate metrics related to servicing of multiple ATM device 220 (e.g., by multiple technicians). In some implementations, server device 230 may perform analytics on the metrics to identify trends, patterns, and/or the like associated with maintenance of the multiple ATM devices 220. For example, server device 230 may identify typical failure times for a component, frequently failing components, and/or the like. In some implementations, user device 210 may use this information to identify a set of tasks to be performed with regard to a particular ATM device 220. In this way, user device 210 can use a variety of types of information to identify a set of tasks to be performed with regard to ATM device 220.

In some implementations, user device 210 may identify the set of tasks by processing the 3D model and/or an image of ATM device 220. For example, user device 210 may process the 3D model and/or the image using an image processing technique (e.g., a computer vision technique, a feature detection technique, etc.) to identify damage to a component, an improper modification to a component, a malfunction to a component (e.g., a jammed component, such as a jammed cash dispenser), tampering of a component, and/or the like.

In this way, user device 210 may identify a set of tasks prior to providing information associated with the set of tasks for display as an augmented reality overlay.

As further shown in FIG. 4, process 400 may include providing, for display via a display, information associated with the set of tasks as an augmented reality overlay (block 440). For example, user device 210 may provide (e.g., using processor 320, memory 330, storage component 340, output component 360, communication interface 370, and/or the like), for display via a display, information associated with the set of tasks as an augmented reality overlay.

In some implementations, the augmented reality overlay may include information, such as computer-generated perceptual information, provided for display on an image of a physical environment, such as to modify and/or compliment the image of the physical environment. For example, the augmented reality overlay may be a constructive augmented reality overlay that is additive to or supports the image of the physical environment shown on a display. Alternatively, the augmented reality overlay may be a deconstructive augmented reality overlay that masks portions the image of the physical environment shown on the display.

In some implementations, the augmented reality overlay may include text, highlights, direction arrows, and/or the like. For example, the augmented reality overlay may highlight a component associated with a task, provide text instruction related to a task to be performed with regard to the component, overlay a name of a component on an image of the component, and/or the like. Additionally, or alternatively, the augmented reality overlay may include a video (e.g., of an individual performing a task). For example, a semi-transparent video may be provided as an augmented reality overlay so that the components of ATM device 220 could be visible behind the video. This facilitates mimicking of an action shown in the video by a technician by facilitating correct positioning of a hand, a tool, and/or the like of the technician.

In some implementations, user device 210 may modify the manner in which the augmented reality overlay is provided for display as a field of view of user device 210 moves. For example, a highlight that is overlaid on a component shown on a display may follow the component as the field of view changes with a user's movement of user device 210. In some implementations, user device 210 may modify the manner in which the augmented reality overlay is provided for display such that the augmented reality overlay follows a component in three dimensions as a user of user device 210 moves user device 210 about, thereby modifying a field of view of user device 210. For example, a set of instructions to push a button would track the button as the field of view of a camera of user device 210 is modified.

In this way, user device 210 may provide information as an augmented reality overlay for display prior to performing an action related to the set of tasks, ATM device 220, and/or the augmented reality overlay.

As further shown in FIG. 4, process 400 may include performing an action related to the set of tasks, the ATM device, and/or the augmented reality overlay after providing the information for display as the augmented reality overlay (block 450). For example, user device 210 may perform (e.g., using processor 320, memory 330, storage component 340, output component 360, communication interface 370, and/or the like) an action related to the set of tasks, ATM device 220, and/or the augmented reality overlay after providing the information for display as the augmented reality overlay.

In some implementations, user device 210 may perform an action to monitor a performance of the set of tasks after providing information associated with the set of tasks for display as the augmented reality overlay. For example, user device 210 may capture (e.g., by a camera of user device 210) a set of images of the set of tasks as the set of tasks is being performed, and may process the set of images (e.g., using an image processing technique) to determine that a task, of the set of tasks, has been completed after capturing the set of images.

In some implementations, user device 210 may capture images periodically, and may process the images to identify a component on which a technician is working, to identify a task being performed, to identify completion of a task, and/or the like. For example, user device 210 may process the set of images to identify an area of ATM device 220 in which a technician is working (e.g., by identifying the technician's hands and/or tools in a particular portion of the image). In this case, user device 210 may be mounted on a tripod, may be a pair of smart eyeglasses paired with a mobile phone, may be a tablet paired with a separate camera, and/or the like. As other examples, user device 210 may identify particular tools to identify tasks being performed, may identify completion of a task by comparing an image of an earlier point in time to a more recent image of the set of components, and/or may identify changes or modifications to components, an absence of previously present damage, the presence of a replacement component (e.g., as identified using an identifier on the exterior of the replacement component), and/or the like.

In some implementations, user device 210 may perform an action to monitor a performance of the set of tasks by processing the images using an image processing technique after capturing the images, by identifying, in the images, one or more indicators (e.g., related to the set of tasks or the set of components) that indicate that a task, of the set of tasks, has been completed, and/or by determining that the task has been performed after identifying the one or more indicators. For example, the one or more indicators may include an absence of previously identified damage, tampering, malfunction etc., an identifier for a replacement component, a modification to a configuration of a component (e.g., resetting of a lever or a latch associated with a component), and/or the like.

In some implementations, user device 210 may update a 3D model for ATM device 220. For example, if a modification is made to a component or a set of components of ATM device 220, user device 210 may replace an older version of a 3D model with an updated 3D model (e.g., in memory resources), may modify a portion of an existing 3D model to include the modification, and/or the like. In this way, a technician that performs later servicing may have access to an accurate 3D model of components of ATM device 220, thereby reducing or eliminating servicing errors related to modifications to the set of components, reducing an amount of time needed for another technician to service ATM device 220 (e.g., by reducing or eliminating a need for the technician to identify modifications to the set of components), and/or the like.

In some implementations, user device 210 may update the augmented reality overlay based on determining that a task, of the set of tasks, has been performed with respect to ATM device 220. In some implementations, user device 210 may update the augmented reality overlay from being associated with a first subset of tasks to being associated with a second subset of tasks. For example, user device 210 may provide different augmented reality overlays for display for different tasks. Additionally, or alternatively, and as another example, user device 210 may modify an augmented reality overlay to identify a current task, to identify a next task to be completed, and/or the like. Additionally, or alternatively, user device 210 may modify a position of the augmented reality overlay on the display as the field of view of the camera moves (e.g., so that a position of the augmented reality overlay is maintained as the field of view of the camera changes).

In some implementations, user device 210 may provide, for display to user device 210 associated with a technical support office of a third party, a report that indicates a progress of a performance of the set of tasks. In some implementations, user device 210 may provide information related to completing the set of tasks to server device 230 to facilitate performance of analytics on performance of the set of tasks by server device 230. For example, information may be aggregated for multiple technicians and may be analyzed to identify bottlenecks in servicing, more efficient technicians, more efficient ordering of tasks, and/or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Although some implementations were described as being performed by user device 210, the implementations may be performed by server device 230 or a combination of user device 210 and server device 230. For example, user device 210 may capture images of components of ATM device 220 and may provide the captured images to server device 230. In this case, server device 230 may process the images to detect the set of components, to identify ATM device 220 as a particular ATM device 220 and/or a particular type of ATM device 220, to identify a set of tasks to be performed with regard to ATM device 220, and/or the like. In some implementations, server device 230 may provide information to user device 210 to be provided as an augmented reality overlay.

In this way, the user device can facilitate faster and/or more accurate servicing of ATM device 220. This improves servicing of ATM device 220 by reducing or eliminating errors associated ATM device 220. In addition, this reduces an amount of training that a technician needs to service ATM device 220, thereby reducing a cost of servicing ATM device 220. Further, this conserves processing resources that would otherwise be consumed by a user looking up instructions on how to service ATM device 220 by providing instructions related to servicing ATM device 220 for display on a display of user device 210. Further, this reduces an amount of downtime for ATM device 220 via faster servicing.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
  detecting, by a device, one or more components of an automated teller machine (ATM) device;
  identifying, by the device, the ATM device as a particular device or as a particular type of device after detecting the one or more components using a combination of computer vision techniques that include a monocular simultaneous localization and mapping (monoSLAM) technique and based on comparing a spatial model of the one or more components to spatial models associated with the particular device or the particular type of device,
    wherein identifying the ATM device comprises:
      determining that a particular combination of components is included in a set of components of the one or more components after detecting the one or more components,
      identifying a closest matching spatial model, of the spatial models, to the spatial model of the one or more components, and
      identifying remaining components individually to identify a modification to an expected set of components;
  identifying, by the device, a set of tasks to be performed with respect to the ATM device based on identifying the ATM device as the particular device or as the particular type of device;

providing, by the device, information associated with the set of tasks as an augmented reality overlay; and performing, by the device, an action after providing the augmented reality overlay for display,
wherein the action is related to at least one of:
the set of tasks,
the ATM device, or
the augmented reality overlay.

2. The method of claim 1, further comprising:
monitoring a performance of the set of tasks by capturing one or more images; and
updating the augmented reality overlay based on monitoring the performance of the set of tasks.

3. The method of claim 1, further comprising:
monitoring performance of the set of tasks by at least one of:
processing images to identify which components of the one or more components are being serviced,
identifying changes in a configuration of the one or more components, or
determining whether the one or more components have been replaced.

4. The method of claim 1, where the one or more components include at least one of:
a cash drawer of the ATM device,
a cash recycler of the ATM device,
a printer of the ATM device,
a keypad of the ATM device,
a processor of the ATM device, or
a display of the ATM device.

5. The method of claim 1, further comprising:
generating the spatial model of the one or more components using the combination of computer vision techniques, wherein the combination of computer vision techniques include a scale-invariant feature transform (SIFT) technique.

6. The method of claim 1, further comprising:
processing the spatial model of the one or more components using a feature extraction technique.

7. The method of claim 1, further comprising:
capturing a set of images of the set of tasks as the set of tasks are being performed; and
processing the set of images to determine that a task, of the set of tasks, has been completed after capturing the set of images.

8. A device, comprising:
a memory; and
one or more processors operatively coupled to the memory, the memory and the one or more processors configured to:
detect one or more components of an automated teller machine (ATM) device;
identify the ATM device as a particular device or as a particular type of device after detecting the one or more components using a combination of computer vision techniques that include a monocular simultaneous localization and mapping (monoSLAM) technique and based on comparing a spatial model of the one or more components to spatial models associated the particular device or the particular type of device,
wherein the one or more processors, when identifying the ATM device, are to:
determine that a particular combination of components is included in a set of components of the one or more components after detecting the one or more components,
identify a closest matching spatial model, of the spatial models, to the spatial model of the one or more components, and
identify remaining components individually to identify a modification to an expected set of components;
identify a set of tasks to be performed with respect to the ATM device based on identifying the ATM device as the particular device or as the particular type of device; and
provide information associated with the set of tasks as an augmented reality overlay.

9. The device of claim 8, wherein the one or more processors are further configured to:
perform an action related to at least one of the set of tasks, the ATM device, or the augmented reality overlay after providing the augmented reality overlay for display.

10. The device of claim 9, wherein the one or more processors are further configured to:
update the augmented reality overlay based on determining that a task, of the set of tasks, has been performed with respect to the ATM device.

11. The device of claim 9, wherein the one or more processors are further configured to:
monitor performance of the set of tasks by at least one of:
processing images to identify which components of the one or more components are being serviced,
identifying changes in a configuration of the one or more components, or
determining whether the one or more components have been replaced.

12. The device of claim 8, where the one or more components include at least one of:
a cash drawer of the ATM device,
a cash recycler of the ATM device,
a printer of the ATM device,
a keypad of the ATM device,
a processor of the ATM device, or
a display of the ATM device.

13. The device of claim 8, wherein the one or more processors are further configured to:
generate the spatial model of the one or more components using the combination of computer vision techniques, wherein the combination of computer vision techniques include a scale-invariant feature transform (SIFT) technique.

14. The device of claim 8, wherein the one or more processors are further configured to:
capture a set of images of the set of tasks as the set of tasks are being performed; and
process the set of images to determine that a task, of the set of tasks, has been completed after capturing the set of images.

15. A non-transitory computer-readable medium storing one or more instructions for wireless communication, the one or more instructions comprising:
one or more instructions that, when executed by one or more processors of a device, cause the one or more processors to:
identify an automated teller machine (ATM) device as a particular device or as a particular type of device after detecting one or more components associated with the ATM device using a combination of computer vision techniques that include a monocular simultaneous localization and mapping (monoSLAM) technique and by comparing a spatial model of the one or more components to spatial models associated the particular device or the particular type of device,
  wherein the one or more instructions, that cause the one or more processors to identify the ATM device, cause the one or more processors to:
    determine that a particular combination of components is included in a set of components of the one or more components after detecting the one or more components,
    identify a closest matching spatial model, of the spatial models, to the spatial model of the one or more components, and
    identify remaining components individually to identify a modification to an expected set of components;
  identify a set of tasks to be performed with respect to the ATM device based on identifying the ATM device as the particular device or as the particular type of device;
  provide information associated with the set of tasks as an augmented reality overlay; and
  perform an action after providing the augmented reality overlay for display,
    wherein the action is related to at least one of:
      the set of tasks,
      the ATM device, or
      the augmented reality overlay.

16. The non-transitory computer-readable medium of claim 15, wherein the one or more instructions, when executed by the one or more processors, further cause the one or more processors to:
  monitor a performance of the set of tasks by capturing one or more images; and
  update the augmented reality overlay based on monitoring the performance of the set of tasks.

17. The non-transitory computer-readable medium of claim 15, wherein the one or more instructions, when executed by the one or more processors, further cause the one or more processors to:
  monitor performance of the set of tasks by at least one of:
    processing images to identify which components of the one or more components are being serviced,
    identifying changes in a configuration of the one or more components, or
    determining whether the one or more components have been replaced.

18. The non-transitory computer-readable medium of claim 15, where the one or more components include at least one of:
  a cash drawer of the ATM device,
  a cash recycler of the ATM device,
  a printer of the ATM device,
  a keypad of the ATM device,
  a processor of the ATM device, or
  a display of the ATM device.

19. The non-transitory computer-readable medium of claim 15, wherein the combination of computer vision techniques include a scale-invariant feature transform (SIFT) technique.

20. The non-transitory computer-readable medium of claim 15, wherein the set of tasks is associated with servicing the ATM device.

* * * * *